(12) United States Patent
Yamada et al.

(10) Patent No.: US 11,077,810 B2
(45) Date of Patent: Aug. 3, 2021

(54) VEHICLE-MOUNTED TERMINAL DEVICE, SERVER DEVICE, AND TERMINAL DEVICE

(71) Applicant: TOYOTA JIDOSHA KABUSHIKI KAISHA, Toyota (JP)

(72) Inventors: Takuji Yamada, Musashino (JP); Takeshi Fujiki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 16/376,244

(22) Filed: Apr. 5, 2019

(65) Prior Publication Data

US 2019/0315297 A1    Oct. 17, 2019

(30) Foreign Application Priority Data

Apr. 11, 2018 (JP) .............................. JP2018-076124

(51) Int. Cl.
*B60R 25/24* (2013.01)
*B60W 50/08* (2020.01)
*B60R 16/037* (2006.01)
*B60R 25/20* (2013.01)

(52) U.S. Cl.
CPC ........ *B60R 16/037* (2013.01); *B60R 25/2081* (2013.01); *B60R 25/246* (2013.01); *B60W 50/08* (2013.01)

(58) Field of Classification Search
CPC ....... B60R 16/037; B60R 25/20; B60R 25/24; B60R 25/2081; B60R 25/246; B60W 50/08
See application file for complete search history.

(56) References Cited

U.S. PATENT DOCUMENTS

| 2013/0041521 A1* | 2/2013 | Basir | B60R 25/33 701/1 |
| 2013/0124009 A1* | 5/2013 | Esler | H04L 67/125 701/2 |
| 2013/0297099 A1* | 11/2013 | Rovik | B60R 16/037 701/2 |

(Continued)

FOREIGN PATENT DOCUMENTS

| JP | 2003-048513 A | 2/2003 |
| JP | 2006-131031 A | 5/2006 |
| JP | 2007-238058 A | 9/2007 |

*Primary Examiner* — Tan Q Nguyen
(74) *Attorney, Agent, or Firm* — Oliff PLC

(57) ABSTRACT

In a vehicle-mounted terminal device configured to be mounted on a vehicle and capable of communicating with a server device, a communication unit transmits identification information of a driver of the vehicle to the server device and receives personal setting information, indicating a setting state of a vehicle-mounted apparatus, transmitted from the server device and related to the identification information of the driver. A setting unit makes setting of a vehicle-mounted apparatus on the vehicle based on the personal setting information received at the communication unit. When the authentication of the driver is completed and when a power supply of the vehicle is turned on, the communication unit receives personal setting information for a vehicle-mounted apparatus, transmitted from the server device and related to the identification information of the driver.

2 Claims, 4 Drawing Sheets

(56) References Cited

U.S. PATENT DOCUMENTS

| | | | | |
|---|---|---|---|---|
| 2014/0052345 A1* | 2/2014 | Tobin | ............... | B60R 16/037 |
| | | | | 701/49 |
| 2014/0222298 A1* | 8/2014 | Gurin | ............... | B60R 25/305 |
| | | | | 701/49 |
| 2014/0379169 A1* | 12/2014 | Camacho | ........... | H04L 67/02 |
| | | | | 701/2 |
| 2015/0057839 A1* | 2/2015 | Chang | ............... | B60R 16/037 |
| | | | | 701/2 |
| 2015/0112512 A1* | 4/2015 | Fan | ................... | B60G 17/02 |
| | | | | 701/2 |
| 2015/0197205 A1* | 7/2015 | Xiong | ............... | B60R 16/037 |
| | | | | 701/49 |
| 2018/0188064 A1* | 7/2018 | Rivers | ............... | G01C 21/203 |
| 2019/0143997 A1* | 5/2019 | Crimando | ........ | B60R 16/037 |
| | | | | 701/37 |

\* cited by examiner

FIG. 3

| DRIVER ID | VEHICLE TYPE INFORMATION | SEAT POSITION INFORMATION | STEERING POSITION INFORMATION | AIR CONDITIONING SETTING INFORMATION | NAVIGATION SETTING INFORMATION | AUDIO SETTING INFORMATION |
|---|---|---|---|---|---|---|

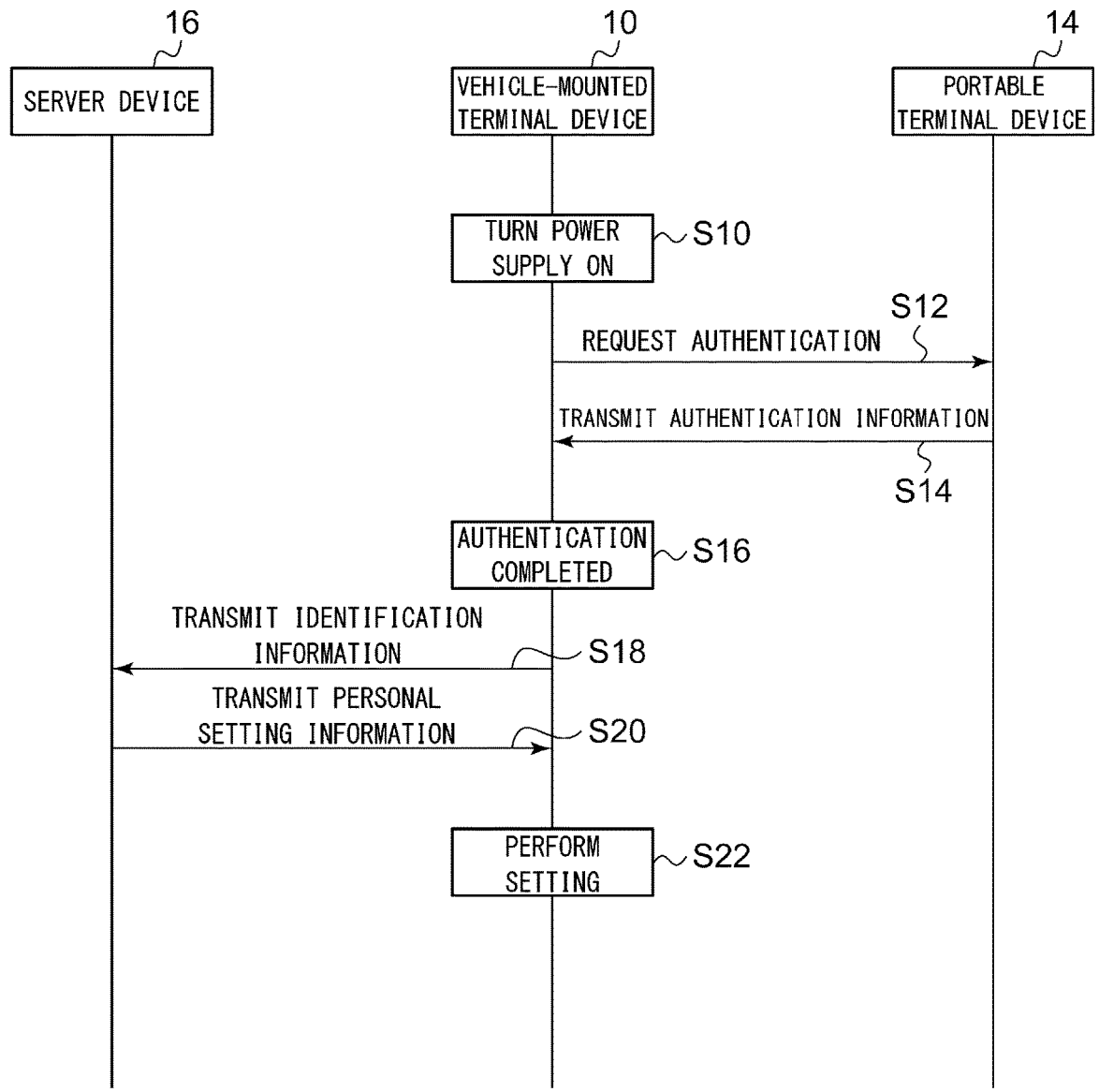

VEHICLE-MOUNTED TERMINAL DEVICE, SERVER DEVICE, AND TERMINAL DEVICE

BACKGROUND

1. Technical Field

The present disclosure relates to a technology for enabling setting of vehicle-mounted apparatuses.

2. Description of Related Art

JP-A-2007-238058 discloses a vehicle-side control system that performs, only when the terminal ID information received from a remote controller coincides with collation ID information stored in the vehicle, processing for unlocking a vehicle door lock mechanism and processing for changing the setting state of vehicle facilities of the vehicle to a stored setting state related to the received personal information.

[Patent Document 1] Japanese Unexamined Patent Application Publication No. 2007-238058 (JP-A-2007-238058)

With the technology disclosed in JP-A-2007-238058, if the vehicle-side control system does not retain information indicating setting states of the vehicle facilities, the vehicle-side control system is unable to perform the processing for changing the setting state of the vehicle facilities of the vehicle to a setting state related to the personal information.

SUMMARY

A general purpose of the present disclosure is to provide a technology for enabling setting of vehicle-mounted apparatuses appropriate for the driver.

In response to the above issue, one aspect of the present disclosure relates to a vehicle-mounted terminal device configured to be mounted on a vehicle and capable of communicating with a server device. The vehicle-mounted terminal device includes: an identification information acquirer configured to acquire identification information of a driver of the vehicle; a communication unit configured to transmit the identification information of the driver of the vehicle to the server device and to receive personal setting information, indicating a setting state of a vehicle-mounted apparatus, transmitted from the server device and related to the identification information of the driver; and a setting unit configured to make setting of a vehicle-mounted apparatus on the vehicle based on the personal setting information received at the communication unit. When the authentication of the driver is completed and when a power supply of the vehicle is turned on, the communication unit receives personal setting information for a vehicle-mounted apparatus, transmitted from the server device and related to the identification information of the driver.

According to this aspect, when the authentication of the driver is completed and when a power supply of the vehicle is turned on, setting of a vehicle-mounted apparatus appropriate for the driver of the vehicle can be made based on the personal setting information.

When personal setting information for a vehicle-mounted apparatus cannot be received from the server device, the setting unit may make setting of the vehicle-mounted apparatus based on personal setting information stored in a portable terminal device of the driver or in the vehicle-mounted terminal device.

When vehicle type information related to the personal setting information for a vehicle-mounted apparatus received at the communication unit is different from vehicle type information of the vehicle provided with the vehicle-mounted terminal device, the setting unit may adjust the personal setting information for the vehicle-mounted apparatus according to the vehicle type information of the vehicle provided with the vehicle-mounted terminal device and make setting of the vehicle-mounted apparatus based on the adjusted setting information for the vehicle-mounted apparatus.

Another aspect of the present disclosure relates to a server device capable of communicating with a vehicle-mounted terminal device. The server device includes: a communication unit configured to receive personal setting information indicating a setting state of a vehicle-mounted apparatus and to also receive identification information of a driver; and a retaining unit configured to retain personal setting information, indicating a setting state of a vehicle-mounted apparatus, related to the identification information of a driver. Upon reception of the identification information of a driver from the vehicle-mounted terminal device, the communication unit transmits personal setting information related to the identification information of the driver to the vehicle-mounted terminal device. According to this aspect, personal setting information for a vehicle-mounted apparatus appropriate for the driver can be provided to the vehicle-mounted terminal device.

Yet another aspect of the present disclosure relates to a terminal device. The terminal device includes: an identification information acquirer configured to acquire identification information of a driver of a vehicle; and a communication unit configured to transmit the identification information of the driver of the vehicle to a server device and to be able to receive personal setting information, indicating a setting state of a vehicle-mounted apparatus, transmitted from the server device and related to the identification information of the driver. When the authentication of the driver is completed and when a power supply of the vehicle is turned on, the communication unit receives personal setting information for a vehicle-mounted apparatus, transmitted from the server device and related to the identification information of the driver.

According to this aspect, when the authentication of the driver is completed and when a power supply of the vehicle is turned on, personal setting information for a vehicle-mounted apparatus related to the identification information of the driver can be received.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 3 is a diagram used to describe personal setting information; and

FIG. 4 is a diagram used to describe a personal setting process for vehicle-mounted apparatuses.

DETAILED DESCRIPTION

An embodiment will now be described. The embodiment is illustrative and is not intended to be limiting.

Figure 1:
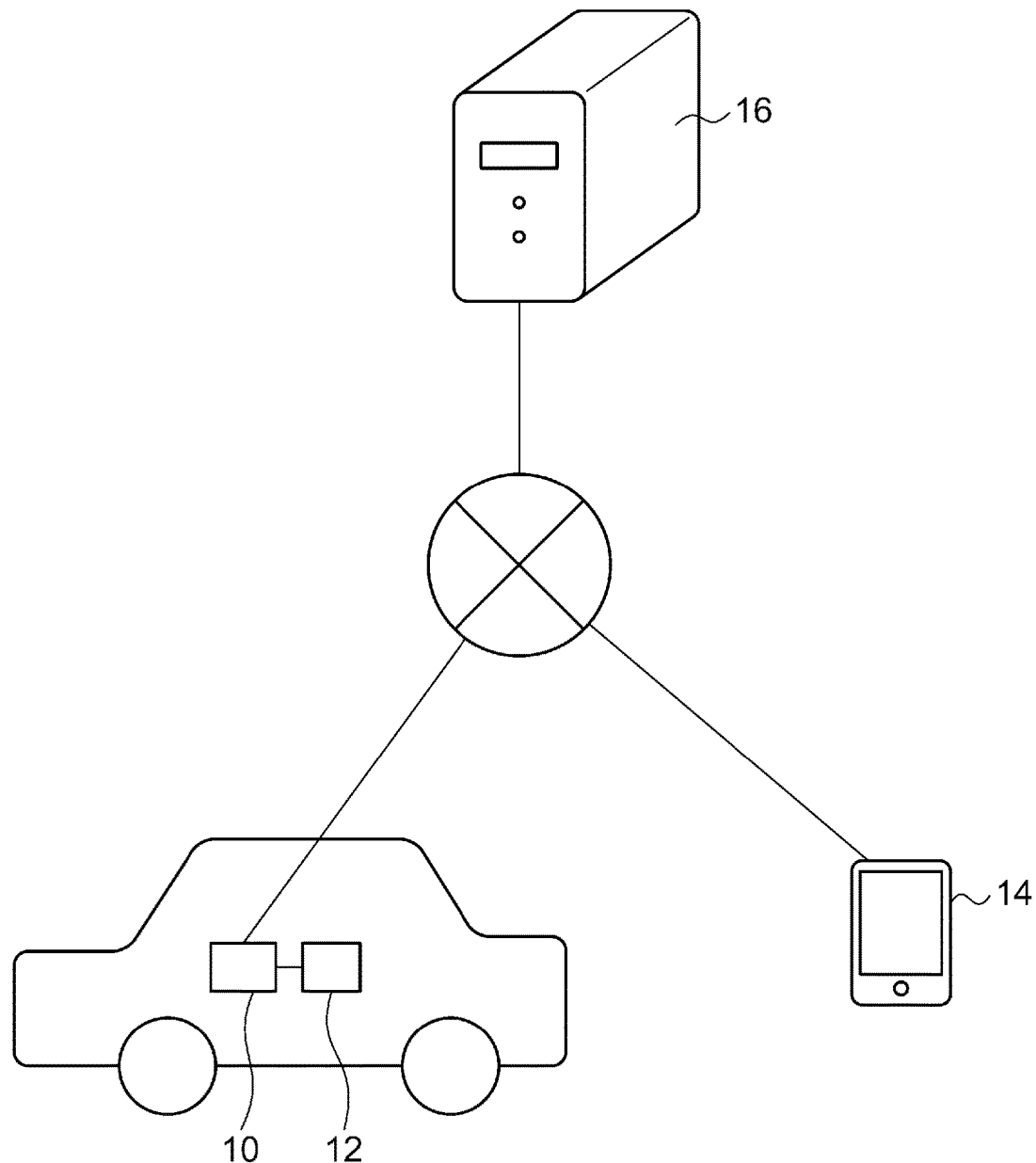
FIG. 1 is a diagram used to describe a personal setting control system of an embodiment.

FIG. 1 is a diagram used to describe a personal setting control system 1 of an embodiment. The personal setting control system 1 includes a vehicle-mounted terminal device 10, a portable terminal device 14, and a server device 16, which can communicate with each other via a network. The vehicle-side personal setting control system 1 stores setting information for vehicle-mounted apparatuses 12 entered by a driver and, when the driver gets into the vehicle again, the personal setting control system 1 makes setting of the vehicle-mounted apparatuses 12 based on the stored setting information.

The vehicle-mounted apparatuses 12 include an apparatus for fixing the driving position of the seat or the steering wheel, an air conditioner for controlling air conditioning within the vehicle, a navigation device for conveying a vehicle position, and an audio device for outputting sound.

With the personal setting control system 1, even when the setting information for the vehicle-mounted apparatuses 12 on a driver's vehicle is changed by another driver or when a driver drives a sharing car or a rental car, setting of the vehicle-mounted apparatuses 12 can be made based on the setting information appropriate for the driver, thereby saving the driver time and effort.

The vehicle-mounted terminal device 10 is mounted on a vehicle, and the setting of the vehicle-mounted apparatuses 12 can be made in the vehicle-mounted terminal device 10. The portable terminal device 14 is personally possessed by a driver and used for identification of the driver. The server device 16 retains personal setting information for the vehicle-mounted apparatuses 12 with respect to each driver. When the vehicle-mounted terminal device 10 and the portable terminal device 14 are not differentiated from each other, they may be simply referred to as terminal devices.

Figure 2:
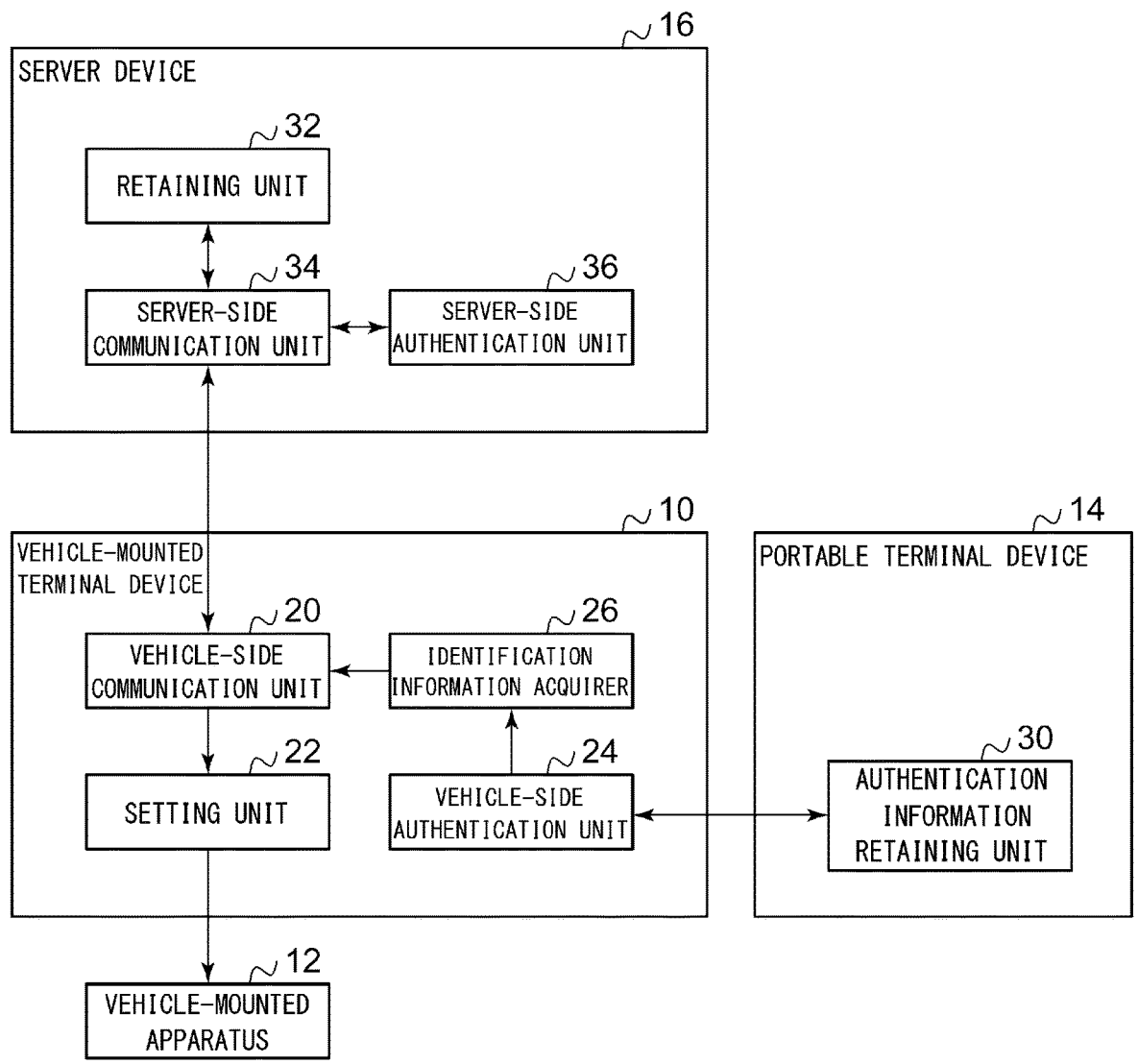
FIG. 2 is a diagram used to describe a functional configuration of the personal setting control system.

FIG. 2 is a diagram used to describe a functional configuration of the personal setting control system 1. Each of the elements represented by functional blocks for performing various processes shown in FIG. 2 can be implemented by a circuit block, a memory, an LSI or the like in terms of hardware, and by a program loaded into a memory or the like in terms of software. Accordingly, it will be obvious to those skilled in the art that these functional blocks may be implemented in a variety of forms by hardware only, software only, or a combination thereof, and the form is not limited to any of them.

The vehicle-mounted terminal device 10 is mounted on a vehicle and includes a vehicle-side communication unit 20, a setting unit 22, a vehicle-side authentication unit 24, and an identification information acquirer 26. The portable terminal device 14 includes an authentication information retaining unit 30. The server device 16 includes a retaining unit 32, a server-side communication unit 34, and a server-side authentication unit 36.

The authentication information retaining unit 30 of the portable terminal device 14 retains authentication information for identifying a driver. When the authentication information of a driver is transmitted from the authentication information retaining unit 30 to the vehicle-side authentication unit 24 of the vehicle-mounted terminal device 10, the driver can be identified in the vehicle-mounted terminal device 10.

When a vehicle-mounted power supply is turned on, the vehicle-side authentication unit 24 of the vehicle-mounted terminal device 10 requests authentication from the portable terminal device 14 via near field communication, for example. The vehicle-mounted power supply serving as the impetus may be an accessory power supply or a main power supply, for example. The near field communication enables communication between the vehicle-mounted terminal device 10 and the portable terminal device 14 within a range of several meters, which means enabling communication therebetween when the portable terminal device 14 is brought into or closer to the vehicle. The vehicle-side authentication unit 24 receives authentication information from the portable terminal device 14 and performs matching with authentication information stored in advance so as to identify the driver. The vehicle-side authentication unit 24 may be capable of communicating with the portable terminal device 14 before the vehicle-mounted power supply is turned on, and may also receive authentication information from the portable terminal device 14 before the vehicle-mounted power supply is turned on.

When the vehicle-mounted power supply is turned on and when the vehicle-side authentication unit 24 completes the authentication of the driver, the vehicle-side communication unit 20 transmits the identification information of the identified driver to the server-side communication unit 34 of the server device 16. The identification information of the driver is stored in advance in the identification information acquirer 26. Each of the authentication information of the driver transmitted from the portable terminal device 14 to the vehicle-mounted apparatuses 12 and the identification information of the driver transmitted from the vehicle-mounted terminal device 10 to the server device 16 is information for identifying the driver, and the authentication information and the identification information may be the same or different from each other. In other words, the identification information of the driver acquired by the identification information acquirer 26 may be the identification information transmitted from the portable terminal device 14 or the identification information stored in advance.

The vehicle-side communication unit 20 receives, from the server device 16, personal setting information indicating a setting state of each vehicle-mounted apparatus 12. Based on the personal setting information thus received, the setting unit 22 makes setting of the vehicle-mounted apparatus 12.

Based on the personal setting information, the setting unit 22 sets the seat position, sets the steering wheel position, sets the temperature or air flow strength of the air conditioner, sets the map display mode or the like of the navigation device, and sets the sound volume or the like of the audio device. On the navigation device, the map can be displayed based on the bearings or the traveling direction of the vehicle.

When the ignition switch is turned off, the vehicle-side communication unit 20 acquires personal setting information for the vehicle-mounted apparatuses 12 from the setting unit 22 and transmits the personal setting information for the vehicle-mounted apparatuses 12 and the identification information of the driver to the server-side communication unit 34 of the server device 16. Accordingly, when the driver gets out of the vehicle, the personal setting information for the vehicle-mounted apparatuses 12 can be stored in the server device 16. The vehicle-side communication unit 20 may also transmit, to the server-side communication unit 34, vehicle type information for the vehicle-mounted apparatuses 12 together with the personal setting information for the vehicle-mounted apparatuses 12 and the identification information of the driver.

The retaining unit 32 of the server device 16 receives the personal setting information for the vehicle-mounted apparatuses 12 and the identification information of the driver from the vehicle-side communication unit 20 and stores the personal setting information for the vehicle-mounted apparatuses 12 and the identification information of the driver related to each other. With regard to the personal setting information, FIG. 3 will be referred to.

FIG. 3 is a diagram used to describe personal setting information for the vehicle-mounted apparatuses 12. The personal setting information for the vehicle-mounted apparatuses 12 is related to the identification information of the driver and the vehicle type information and includes seat position information, steering position information, air conditioning setting information, navigation setting information, and audio setting information. The retaining unit 32 retains those pieces of personal setting information for the vehicle-mounted apparatuses 12 with respect to each driver. The retaining unit 32 may also retain update date and time on which the personal setting information is acquired.

Since the retaining unit 32 retains the personal setting information for the vehicle-mounted apparatuses 12 with respect to each driver, when a driver drives a sharing car or a rental car, the driver can make setting of the vehicle-mounted apparatuses 12 using the personal setting information.

The description will now return to FIG. 2. Upon reception of the identification information of the driver from the vehicle-side communication unit 20, the server-side communication unit 34 acquires the personal setting information related to the identification information from the retaining unit 32 and transmits the personal setting information related to the identification information to the vehicle-side communication unit 20.

The server-side authentication unit 36 performs authentication processing for a driver to enable identification of the driver in the server device 16. The authentication information retaining unit 30 of the portable terminal device 14 functions as an identification information acquirer and retains the identification information of the driver. The portable terminal device 14 acquires vehicle identification information from the vehicle-mounted terminal device 10 after the vehicle-mounted power supply is turned on, and transmits the identification information of the driver and the vehicle identification information to the server device 16. When the server-side authentication unit 36 receives the identification information of the driver from the portable terminal device 14 and the authentication of the driver is completed, the server-side communication unit 34 transmits, to the vehicle-side communication unit 20 or the portable terminal device 14, the personal setting information for the vehicle-mounted apparatuses 12 related to the identification information of the driver. When the portable terminal device 14 receives the personal setting information for the vehicle-mounted apparatuses 12, the portable terminal device 14 transmits the personal setting information to the vehicle-mounted terminal device 10 and allows the vehicle-mounted terminal device 10 to make setting of the vehicle-mounted apparatuses 12 based thereon.

FIG. 4 is a diagram used to describe a personal setting process for the vehicle-mounted apparatuses 12. A driver carrying the portable terminal device 14 gets into a vehicle and turns on the vehicle-mounted power supply (S10). Accordingly, it is recognized in the vehicle-mounted terminal device 10 that the driver is present within the vehicle. The vehicle-side authentication unit 24 transmits a signal for requesting authentication to the portable terminal device 14 via near field communication (S12), and the portable terminal device 14 transmits the authentication information of the driver to the vehicle-side authentication unit 24 (S14). The authentication by the portable terminal device 14 may be completed before the vehicle-mounted power supply is turned on.

When the vehicle-side authentication unit 24 completes the authentication of the driver (S16), the vehicle-side communication unit 20 transmits the identification information of the driver to the server-side communication unit 34 and requests the personal setting information (S18). Accordingly, the server-side communication unit 34 transmits to the vehicle-side communication unit 20 the personal setting information related to the identification information of the driver (S20). Based on the personal setting information received at the vehicle-side communication unit 20, the setting unit 22 makes setting of the vehicle-mounted apparatuses 12 (S22). Thus, the personal setting process for making setting of the vehicle-mounted apparatuses 12 appropriate for the driver is completed. Since setting of the vehicle-mounted apparatuses 12 is automatically performed, the driver's time and effort can be saved.

When the vehicle-side communication unit 20 is unable to receive the personal setting information for the vehicle-mounted apparatuses 12 from the server device 16, the setting unit 22 may make setting of the vehicle-mounted apparatuses 12 based on the personal setting information for the vehicle-mounted apparatuses 12 stored in the portable terminal device 14 of the driver. For example, when the vehicle-mounted terminal device 10 is present underground and unable to communicate with the server device 16, the vehicle-mounted terminal device 10 may acquire the personal setting information for the vehicle-mounted apparatuses 12 from the portable terminal device 14 via near field communication. To the portable terminal device 14, the personal setting information for the vehicle-mounted apparatuses 12 may be regularly transmitted from the server device 16.

When the vehicle-side communication unit 20 is unable to receive the personal setting information for the vehicle-mounted apparatuses 12 from the server device 16, the setting unit 22 may make setting of the vehicle-mounted apparatuses 12 based on the personal setting information for the vehicle-mounted apparatuses 12 stored in the vehicle-mounted terminal device 10. The vehicle-mounted terminal device 10 may retain the personal setting information for the vehicle-mounted apparatuses 12 together with the identification information of the driver of the time when the driver drove the vehicle in the past, and, when the driver is identified, the personal setting information for the vehicle-mounted apparatuses 12 may be transmitted to the setting unit 22.

The retaining unit 32 may retain the update date and time of the personal setting information, and the portable terminal device 14 may also retain the update date and time of the personal setting information acquired from the server device 16. The setting unit 22 may compare the update date and time of the personal setting information retained in the server device 16 and the update date and time of the personal setting information retained in the portable terminal device 14 and may make setting of the vehicle-mounted apparatuses 12 based on the newer personal setting information.

When the vehicle-side communication unit 20 is unable to receive the personal setting information for the vehicle-mounted apparatuses 12 from the server device 16, the setting unit 22 may leave the task of the personal setting process and wait until the vehicle-side communication unit 20 becomes able to communicate with the server device 16. When the vehicle is moved to a position where communication is possible and the vehicle-side communication unit 20 receives the personal setting information from the server device 16, the setting unit 22 checks with the driver whether or not the setting of the vehicle-mounted apparatuses 12 based on the personal setting information may be performed. Upon reception of approval from the driver, the setting unit 22 performs setting of the vehicle-mounted apparatuses 12 based on the personal setting information. While the vehicle is moving, the setting unit 22 may be forbidden to change the settings on the vehicle-mounted apparatuses 12. Also, there may be both vehicle-mounted apparatuses 12 on which changing the settings is forbidden while the vehicle is moving, and vehicle-mounted apparatuses 12 on which the settings can be changed even while the vehicle is moving. For example, although changing the settings on the seat position and the steering wheel position may be forbidden while the vehicle is moving, the settings on the air conditioning and the audio may be changed even while the vehicle is moving.

When the vehicle type related to previous personal setting information for the vehicle-mounted apparatuses 12 received at the vehicle-side communication unit 20 is different from the vehicle type of the vehicle provided with the vehicle-mounted terminal device 10, the setting unit 22 may adjust the previous personal setting information according to the vehicle type of the vehicle provided with the vehicle-mounted terminal device 10 and make setting of the vehicle-mounted apparatuses 12 based on the adjusted setting information. In other words, when the vehicle type information related to the personal setting information retained in the server device 16 does not coincide with the vehicle type information for identifying the vehicle provided with the vehicle-mounted terminal device 10, the personal setting information may be amended according to the vehicle type and applied to the vehicle-mounted apparatuses 12. Accordingly, even when the driving position of the seat or the like is different depending on the vehicle type, the personal setting information can be adjusted and adapted to the vehicle type. In this case, the setting unit 22 may store in advance a conversion table with which the personal setting information can be adjusted according to the vehicle type.

With regard to the settings on the driving positions, such as the seat position and the steering position, the setting unit 22 may be forbidden to adjust or change the settings when the vehicle type is different, and, with regard to the settings on vehicle-mounted apparatuses 12 that do not directly affect the driving, such as the air conditioning settings, navigation settings, and audio settings, the setting unit 22 may be allowed to adjust the personal setting information according to the vehicle type and make setting of the vehicle-mounted apparatuses 12 based on the adjusted personal setting information. In this way, the setting unit 22 may perform adjustment of the personal setting information according to the vehicle type only for part of the vehicle-mounted apparatuses 12. In any case, the setting unit 22 can automatically make setting of the vehicle-mounted apparatuses 12 based on the personal setting information adjusted according to the vehicle type.

The embodiment is intended to be illustrative only, and it will be obvious to those skilled in the art that various modifications to a combination of constituting elements could be developed and that such modifications also fall within the scope of the present disclosure.

Although the embodiment describes a mode in which the identification of the driver is performed in the portable terminal device 14 and the vehicle-mounted terminal device 10, the mode is not limited thereto. For example, the vehicle-side authentication unit 24 may identify the driver by receiving authentication information entered by the driver, or by analyzing an image captured within the vehicle acquired from an in-vehicle camera and performing face identification processing. In any case, the vehicle-side authentication unit 24 retains the authentication information for identifying the driver.

In another mode of authentication processing, another server device, different from the server device 16, may perform authentication processing for the driver. Accordingly, the portable terminal device 14 may transmit the authentication information to the another server device different from the server device 16, and, when the another server device completes the authentication of the portable terminal device 14, the another server device may issue the identification information of the driver, which proves the completion of the authentication, to the portable terminal device 14. When the vehicle-mounted power supply is turned on and the portable terminal device 14 and the vehicle-mounted terminal device 10 become able to communicate with each other via near field communication, the portable terminal device 14 may transmit to the vehicle-mounted terminal device 10 the identification information of the driver issued by the another server device, or the another server device may transmit to the vehicle-mounted terminal device 10 the identification information of the driver upon reception of a request for the identification information from the portable terminal device 14.

What is claimed is:

1. A vehicle-mounted terminal device configured to be mounted on a vehicle and capable of communicating with a server device, the vehicle-mounted terminal device comprising:
   an identification information acquirer configured to acquire identification information of a driver of the vehicle;
   a communication unit configured to transmit the identification information of the driver of the vehicle to the server device and to receive personal setting information, indicating a setting state of a vehicle-mounted apparatus, transmitted from the server device and related to the identification information of the driver; and
   a setting unit configured to make setting of a vehicle-mounted apparatus on the vehicle on the basis of the personal setting information received at the communication unit, wherein
   when the authentication of the driver is completed and when a power supply of the vehicle is turned on, the communication unit transmits the identification information of the driver of the vehicle to the server device and receives personal setting information for a vehicle-mounted apparatus, transmitted from the server device and related to the identification information of the driver, and
   when personal setting information for a vehicle-mounted apparatus cannot be received from the server device, the setting unit makes setting of the vehicle-mounted apparatus on the basis of personal setting information stored in a portable terminal device of the driver or in the vehicle-mounted terminal device.

2. The vehicle-mounted terminal device of claim 1, wherein, when the vehicle type related to personal setting information for a vehicle-mounted apparatus received at the communication unit is different from the vehicle type of the vehicle provided with the vehicle-mounted terminal device, the setting unit adjusts the personal setting information according to the vehicle type of the vehicle provided with the vehicle-mounted terminal device and makes setting of the vehicle-mounted apparatus on the basis of the adjusted setting information for the vehicle-mounted apparatus.

\* \* \* \* \*